3,264,685
TOY EXTRUDER
Robert Boggild and William L. Dale, both of
5463 Hill and Dale Drive, Cincinnati, Ohio
Filed Feb. 28, 1963, Ser. No. 261,614
8 Claims. (Cl. 18—12)

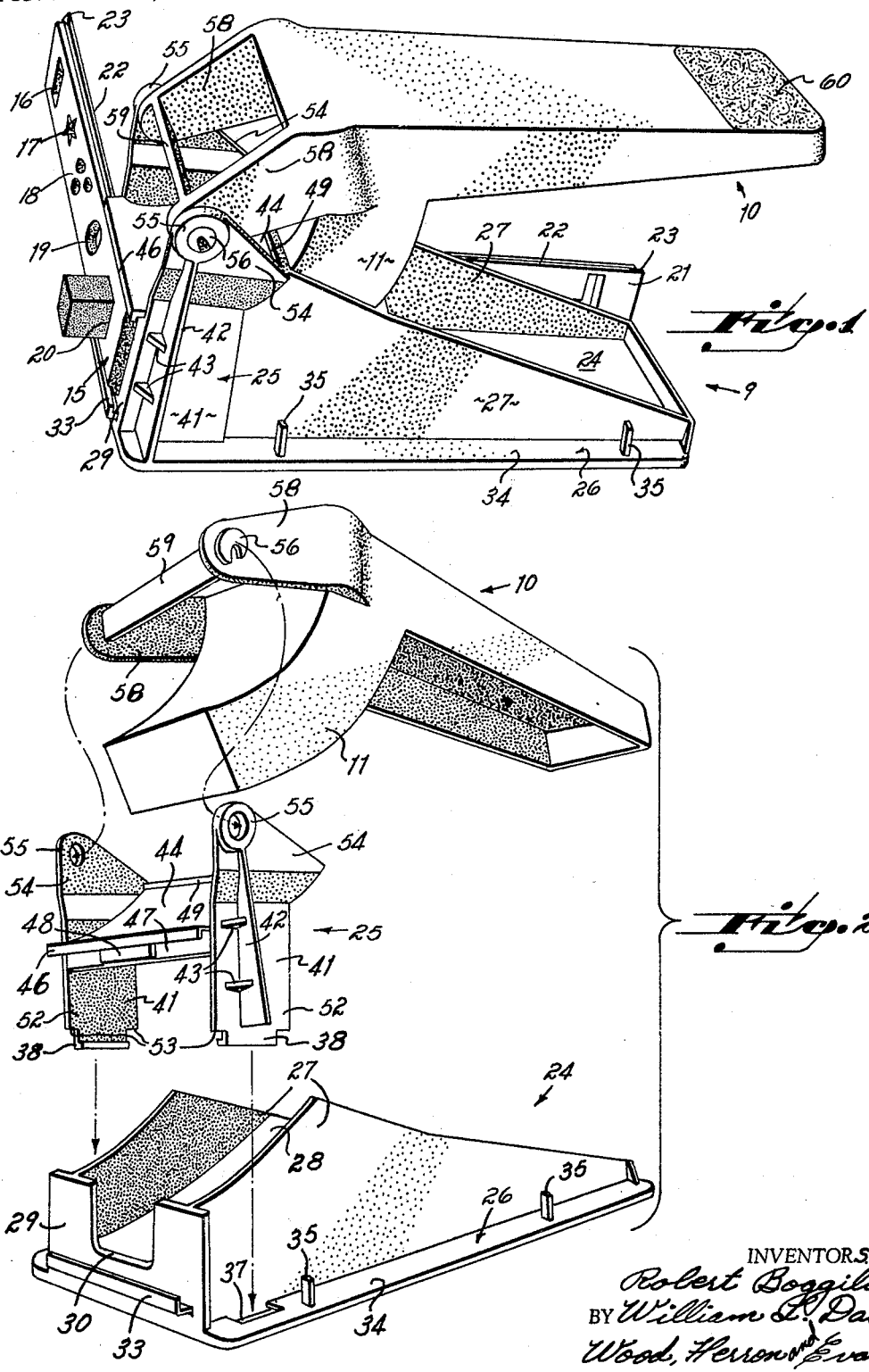

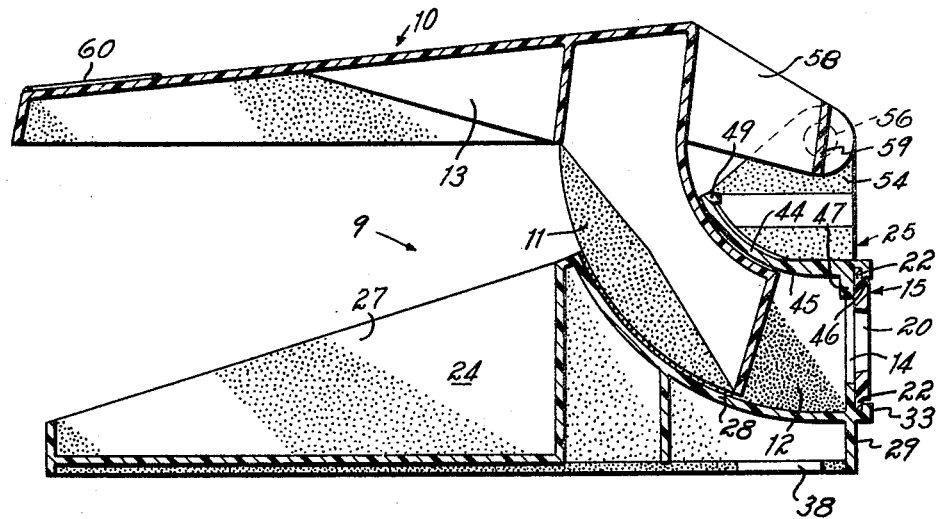
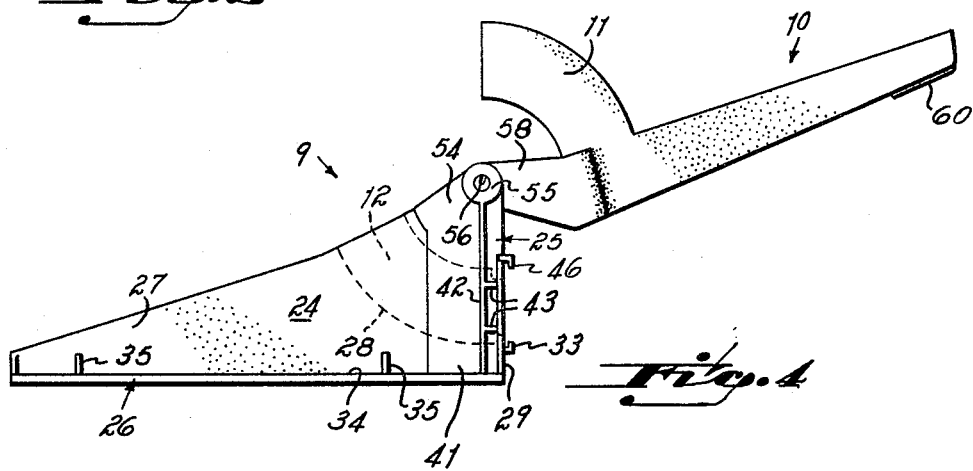

This invention relates to a toy extruder for expelling modeling compound through dies of various shapes.

Modeling compounds, such as clay and other similar materials, have always been a source of great fascination for children as well as adults. The more imaginative children find a greater pleasure in the use of modeling compound for, in their flights of imagination, they are able to create a wide variety of unusual designs. The less imaginative children are likely to confine themselves to the formation of simple ash trays, balls and elongated snake-like elements. They soon tire of play with modeling compounds.

The objective of the invention is to provide a device which children can use to extrude many different cross sectional configurations of modeling compound. The different cross sections have the effect of stimulating the imaginations of otherwise unimaginative children and in this way greatly increase the joy of playing with modeling clay.

In our copending application Serial No. 849,645, filed October 29, 1959, now abandoned, we have disclosed an extruder for modeling compound having a piston actuated by a lever for driving modeling compound through a discharge opening. The discharge opening is adapted to be covered by a die of the cross sectional configuration which it is desired to extrude. This extruder is in a sense a sophisticated device requiring a higher level of skill for its operation than the present invention. Compared to the present invention, it is more expensive and more complicated to operate.

It has been an objective of the invention to simplify greatly the construction of the extruder in order to reduce its cost and to simplify its operation so that children, even as young as three years old, can operate it successfully. In the furtherance of this objective, we have provided an extruder which, excepting its dies, is manufactured from only three molded plastic parts, the parts being so joined and oriented with respect to each other to mutually strengthen each other. The resultant structure has an arcuate hopper, or chamber, through which an arcuate piston is driven to force modeling compound through the discharge opening of the chamber. The piston and its operating lever is constituted by a single element in which the piston is rigid and integral with the operating lever. The elimination of any articulation between the piston and operating lever reduces the complexity of the extruding operation to a simple in and out motion which any child can perform. Further, the ability to manufacture the piston and operating lever in a single molding operation and without any assembling step minimizes the manufacturing cost of the device.

Another objective of the invention has been to provide at least one die plate having a plurality of differently configurated extrusion orifices spaced along its length and to adapt the discharge opening to receive such a plate. This objective of the invention contemplates the provision of means for slidably mounting the die plate with respect to the discharge opening of the supply chamber whereby any selected extrusion orifice can be positioned over the discharge opening merely by sliding the plate. The sliding die plate has advantages over and above those of the economy and simplicity of providing plural die configurations on a single plate. For example, whereas it is necessary in our earlier extruder to slice the extruded form from the die with a knife, the die plate of the present invention can function as its own guillotine to sever the molded form merely by sliding the die with respect to the discharge opening. Further, the extrudable configurations are not restricted to the orifice cross sections in the die plate, for by shifting the die plate so that the extrusion orifice covers only a portion of the discharge opening, fractional portions of the selected configuration may be extruded.

Still another advantage of the slidable die plate is that it admits of the mounting of two different slide plates along the side of the extruder in order to make a compact package of the device and to provide a convenient storage for the die plates when the device is not in use.

Another objective of the invention has been to provide a toy extruder which is substantially self-cleaning. The relationship of the piston to the chamber through which it passes is such that a full stroke of the piston will drive the modeling compound substantially completely from its chamber. Further, because of the arcuate shape of the chamber, in the event that a slug of compound is inadvertently left in the chamber for a long period of time, it will dry out and in the process shrink away from the walls of the chamber so that it can be removed by merely turning the extruder upside-down and dumping it out.

These and other objectives of the invention will become more readily apparent from the following detailed description taken in conjunction with the following drawings in which:

FIG. 1 is a perspective view of the invention,

FIG. 2 is a disassembled perspective view of the invention,

FIG. 3 is a longitudinal cross sectional view of the invention, and

FIG. 4 is a side elevational view showing the piston and operating lever in open position.

Referring to the drawings, the extruder comprises a base 9 to which an integral operating lever 10 and piston 11 is pivoted. The piston and lever unit is braced by a central rib 13. The base 9 has an arcuate chamber 12 through which the piston 11 may slidably pass. The chamber 12 has a discharge opening 14 through which modeling compound is expelled as the piston 11 moves toward the discharge opening. A die plate 15 is shown slidably mounted with respect to the discharge opening 14 and has extrusion orifices 16, 17, 18, 19 and 20, any selected one of which may be positioned over the discharge opening 14 to confine the position of the modeling compound as it is extruded. A second die plate 21 is shown mounted in storage position on the side of base 9 and has five orifice configurations different from each other and from those of plate 15. Each die plate has mounting flanges 22 on each side thereof, the mounting flanges being terminated in tapered ends 23 to facilitate their mounting over the discharge opening.

The base 9 of the extruder comprises a bottom section 24 and a cover section 25. The bottom section 24 has a base plate 26 and two vertical side walls 27 between which is mounted an arcuate lower chamber wall 28. The chamber wall 28 presents an upwardly facing concave arcuate surface along which the piston 11 slides. The bottom section has a U-shaped front wall 29 having a deep slot 30 forming the major portion of the discharge opening 14. A bottom track 33 is molded integrally with the front wall 29 to form a part of the support for the sliding die plate.

The base plate 26 has longitudinal edge portions 34 which project beyond the side walls 27. A pair of pegs 35 project perpendicularly from the upper surface of the edge portions 34 and are spaced outwardly from the side walls 27 to form brackets for the storage of the slide plates 15 and 21 on each side of the bottom section.

Each longitudinal edge portion 34 has a slot 37 at its forward end to receive flanged lower ends 38 of the cover section 25.

The cover section 25 has side walls 41 which are reinforced by vertical ribs 42 which are buttressed as at 43. The side walls 41 support between them an arcuate upper chamber wall 44 which presents a convex arcuate surface 45 forming the upper wall of the chamber 12. The forward edge of the chamber wall 44 has a downwardly directed flange 46 which, when the cover section is in position, overlies the front wall 29 of the bottom section and is spaced from it to form the upper track which slidably receives the die plate 15 or 21 as best illustrated in FIGURE 3. A second downwardly directed flange 47 is parallel to the flange 46 and spaced rearwardly of it to overlie the upper portion of the rear surface of front wall 29. A block 48 is integral with the front surface of flange 47 and is slidable into the deep slot 30 which forms the discharge opening 14. When the upper section is in position, the flange 47 and block 48 complete the formation of the discharge opening. Further, the front wall 29 and flange 47 are secured together by a plastic solvent and are mutually reinforcing.

At the upper edge of the chamber wall 44 a rib 49 is formed to brace that upper edge, and to reinforce it against the pressure which the modeling compound applies to it when it is driven through the chamber by the piston 13.

The side walls 41 of the cover section have lower portions 52 which extend below the chamber wall 44 and overlie and are adhesively secured to the forward ends of the side walls 27 of bottom section 24. The lower wall portions 52 terminate in shoulders 53 and the flanged ends 38. The flanged ends 38 drop through the slots 37 and hook under the side walls 27 with shoulders 53 bearing against plate 26 to position the cover section properly with respect to the bottom section. The securing of the lower side wall portions 52 of the cover section to the side walls 27 of the bottom section reinforces the discharge chamber over the area at which the greatest stress from the pressure of the modeling compound occurs.

Above the chamber wall 44 the side walls form two trunnion carriages 54 which terminate in bearings 55. The bearings 55 receive trunnions 56 which are fixed to the integral operating lever 10 and pivotally mount the lever 10 to the base 9.

The lever 10 terminates at its forward end in a pair of arms 58 which are braced by a transverse bar 59. The trunnions 56 are mounted on the ends of the arms 58. At the rearward end of the lever 10, the upper surface is roughened as at 60 to provide a good friction engagement of the hand of the operator with the lever as the lever is depressed.

In assembling the device, the trunnions 56 are first inserted into their bearings 55. Before the upper section is secured to the bottom section, there is sufficient flexure of the side walls 41 of the upper section to permit the trunnion carriages to resiliently spread apart in order to receive the trunnions. Thereafter, the upper section is dropped into position on the bottom section with the flanged ends snapping through the slots 37 and under the edges of side walls 27. Preliminary to the assembly of the cover section to the bottom section, a plastic solvent is spread over those surfaces which will be in fixed contact, including the inside surfaces of lower wall portions 52 and the front surface of the flange 47.

Nothing more is required to assemble the extruder. In operation, one of the die plates 15 is slid into position between the lower and upper tracks 33 and 46 respectively until the desired extrusion orifice 16–20 is positioned over the discharge opening 14. Modeling compound is then introduced into the chamber 12 and forced through the discharge opening and the extrusion orifice by depressing the lever 10. As the lever 10 is depressed, the piston 13 moves in an arcuate path through the arcuate chamber to expel the modeling compound.

The pivotal axis of the lever 10, that is the centers of the trunnions 56, forms the center of concentric circles which define both the surfaces of the upper and lower walls of the chamber 12 as well as the arcuate walls of the piston 11. Through this design, there is no possibility of jamming of the piston with respect to its chamber, for the piston is automatically aligned with the chamber 12. There is no need for articulation between the piston 11 and its lever 10 and the piston and lever combination can be molded as a single integral unit.

When a child is finished playing with the extruder, the slide plates may be returned to the storage position between walls 27 and pegs 35 where they will not become lost.

We claim:

1. A toy extruder comprising,
   a flat elongated base,
   side walls projecting integrally upwardly from said base and spaced inwardly from the side edges of said base,
   a pair of spaced arcuate walls located between said side walls and forming with said side walls an arcuate chamber in said base having a supply opening and a discharge opening,
   an operating lever mounted between said side walls for pivotal movement about an axis which is coincident with the center of circles defining said arcuate walls,
   an arcuate piston integral with said lever and slidable in said chamber,
   a slide holder at the discharge end of said chamber,
   a slide plate slidably mounted in said holder, said slide plate having a plurality of differently configurated openings selectively positionable over said discharge opening,
   and at least one upwardly projecting post on each side edge of said base spaced from said respective side wall to form storage means on said base for receiving said slide plate.

2. A toy extruder comprising,
   a flat elongated base,
   two generally right triangular side walls and a front wall projecting upwardly from said base, said side walls having holes at the upper, forward ends thereof,
   means including portions of said side walls forming an arcuate chamber in said base, said arcuate chamber terminating at one end in a discharge opening in said front wall,
   an operating lever mounted between said side walls and having laterally projecting trunnions inserted in said holes for pivotal movement about an axis which is coincident with the center of circles defining said arcuate chamber,
   an arcuate piston integral with said lever and slidable in said chamber,
   a slide holder at the discharge end of said chamber,
   and a slide plate slidably mounted in said holder, said slide plate having a plurality of differently configurated openings selectively positionable over said discharge opening.

3. A toy extruder comprising,
   a flat elongated base,
   side walls and a front wall projecting upwardly from said base,
   means including portions of said side walls forming an arcuate chamber in said base, said arcuate chamber terminating at one end in a discharge opening in said front wall,
   an operating lever mounted between said side walls for pivotal movement about an axis at one end of said base which is coincident with the center of circles defining said arcuate chamber, said lever being substantially of the same length as said base, an arcuate piston integral with said lever and slidable in said chamber, spaced horizontal flanges on said front wall forming a slide holder at the discharge end of said chamber, and a slide plate slidably mounted in said holder, said slide plate having a plurality of differently configurated openings selectively positionable over said discharge opening.

4. The method of manufacturing a plastic toy extruder comprising the steps of, molding a bottom section having an upwardly facing surface, and a front wall portion having a discharge opening and a track below the opening, molding a cover section having a downwardly facing convex arcuate wall located between two spaced side walls, said side walls including spaced trunnion carriages projecting upwardly from said arcuate wall, and said cover section including means forming an upper track, molding a lever having an arcuate piston and having integral trunnions projecting therefrom, inserting said trunnions into said trunnion carriages, and joining said sections together to form a base having an arcuate chamber for the receipt of modeling compound, said sections presenting said tracks in spaced parallel relation adapted to receive a slide plate having extrusion die openings.

5. The method of manufacturing a plastic toy extruder comprising the steps of, molding a bottom section having side walls, a front wall having a discharge opening and a track below said opening and between the side walls a lower chamber wall presenting an upwardly facing concave arcuate surface, and having side flanges projecting from the lower edges of said side walls and each flange having a slot at its forward edge, molding a cover section having side walls and an upper chamber wall spaced from said lower chamber wall and presenting a downwardly facing convex arcuate surface, said side walls of said cover section terminating in flanged elements, said cover section including means forming an upper track, molding a lever having an integral arcuate piston, pivotally mounting said lever between said side walls of said cover section, passing said flanged elements through said slots to hook them under the bottom section side walls, and joining the side walls of said cover and bottom sections to join said sections together to form a base having an arcuate chamber for the receipt of modeling compounds, said sections presenting said tracks in spaced parallel relation adapted to receive a slide plate having extrusion die openings.

6. The method of manufacturing a plastic toy extruder comprising the steps of, molding a bottom section having side walls, a front wall having a discharge opening and means for receiving a slide plate and between the side walls a lower chamber wall presenting an upwardly facing concave arcuate surface, and having side flanges projecting from the lower edges of said side walls and each flange having a slot at its forward edge, molding a cover section having side walls and an upper chamber wall and presenting a downwardly facing convex arcuate surface, said side walls of said cover section terminating in flanged elements, said cover section including means for receiving a slide plate, passing said flanged elements through said slots to hook them under the bottom section side walls, and joining the side walls of said cover and bottom sections to join said sections together to form a base having an arcuate chamber for the receipt of modeling compound, said sections presenting said receiving means in spaced relation to receive a slide plate having extrusion die openings.

7. The method of manufacturing a plastic toy extruder comprising the steps of, molding a bottom section having side walls, a front wall having a discharge opening and means for receiving a slide plate and between the side walls a lower chamber wall presenting an upwardly facing concave arcuate surface, said front wall having a deep slot forming a discharge opening, molding a cover section having side walls and an upper chamber wall presenting a downwardly facing convex arcuate surface, said upper chamber wall having a depending flange and slide plate receiving means at its forward edge, joining the side walls of said cover and bottom sections to join said sections together to form a base having an arcuate chamber for the receipt of modeling compound with said depending flange engaging said front wall and completing said discharge opening, said sections presenting said receiving means in spaced relation to receive a slide plate having extrusion die openings.

8. The method of manufacturing a toy extruder comprising the steps of, molding a bottom section having a concave arcuate surface, and a front wall portion having a discharge opening and a track below the opening, molding a cover section having a convex arcuate surface, said cover section including means forming an upper track, molding an integral lever and an arcuate piston fixed on said lever, pivotally mounting said lever on said cover section, and joining said sections together to form a base having an arcuate chamber for the receipt of modeling compound, said sections presenting said tracks in spaced parallel relation adapted to receive a slide plate having extrusion die openings.

References Cited by the Examiner

UNITED STATES PATENTS

| | | | |
|---|---|---|---|
| 1,731,186 | 10/1929 | Young | 18—3.5 |
| 2,070,096 | 2/1937 | Smith. | |
| 2,228,175 | 1/1941 | Miller | 146—115 |
| 2,578,105 | 12/1951 | Taylor | 18—12 X |
| 3,001,485 | 9/1961 | Czik | 107—52 X |

WILLIAM J. STEPHENSON, *Primary Examiner.*

MICHAEL V. BRINDISI, MARCUS U. LYONS,
*Examiners.*

L. S. SQUIRES, *Assistant Examiner.*